United States Patent

[11] 3,622,905

[72] Inventor Paul Merrill Brown
 Los Angeles, Calif.
[21] Appl. No. 307,886
[22] Filed Sept. 4, 1952
[45] Patented Nov. 23, 1971
[73] Assignee The United States of America as
 represented by the Secretary of the Army

[54] RANDOM PULSE GENERATOR
 4 Claims, 2 Drawing Figs.
[52] U.S. Cl. ................................. 331/78,
 331/148, 331/149, 331/175, 343/18 E
[51] Int. Cl. ....................................... H03k 3/82,
 H03k 3/16
[50] Field of Search ............................. 343/17.1,
 18, 18 E; 250/27 TR, 27 PD, 6.6, 17; 331/78, 148,
 149, 175

[56] References Cited
 UNITED STATES PATENTS
 2,633,555  3/1953  Tourshore ................... 315/27

*Primary Examiner*—Daniel C. Kaufman
*Assistant Examiner*—Rodney D. Bennett, Jr.
*Attorneys*—Harry M. Saragovitz and Lawrence Glassman CLAIM: 1. A random pulse generator comprising a blocking oscillator having an input circuit and output circuit, a random frequency noise source connected to said input circuit for triggering said oscillator, integrating means connected to said output circuit for generating a direct current voltage proportional to the average repetition frequency of the output pulses of said oscillator, and means for coupling said direct current voltage to said input circuit whereby the period of said average repetition frequency is maintained substantially constant.

PATENTED NOV 23 1971 3,622,905
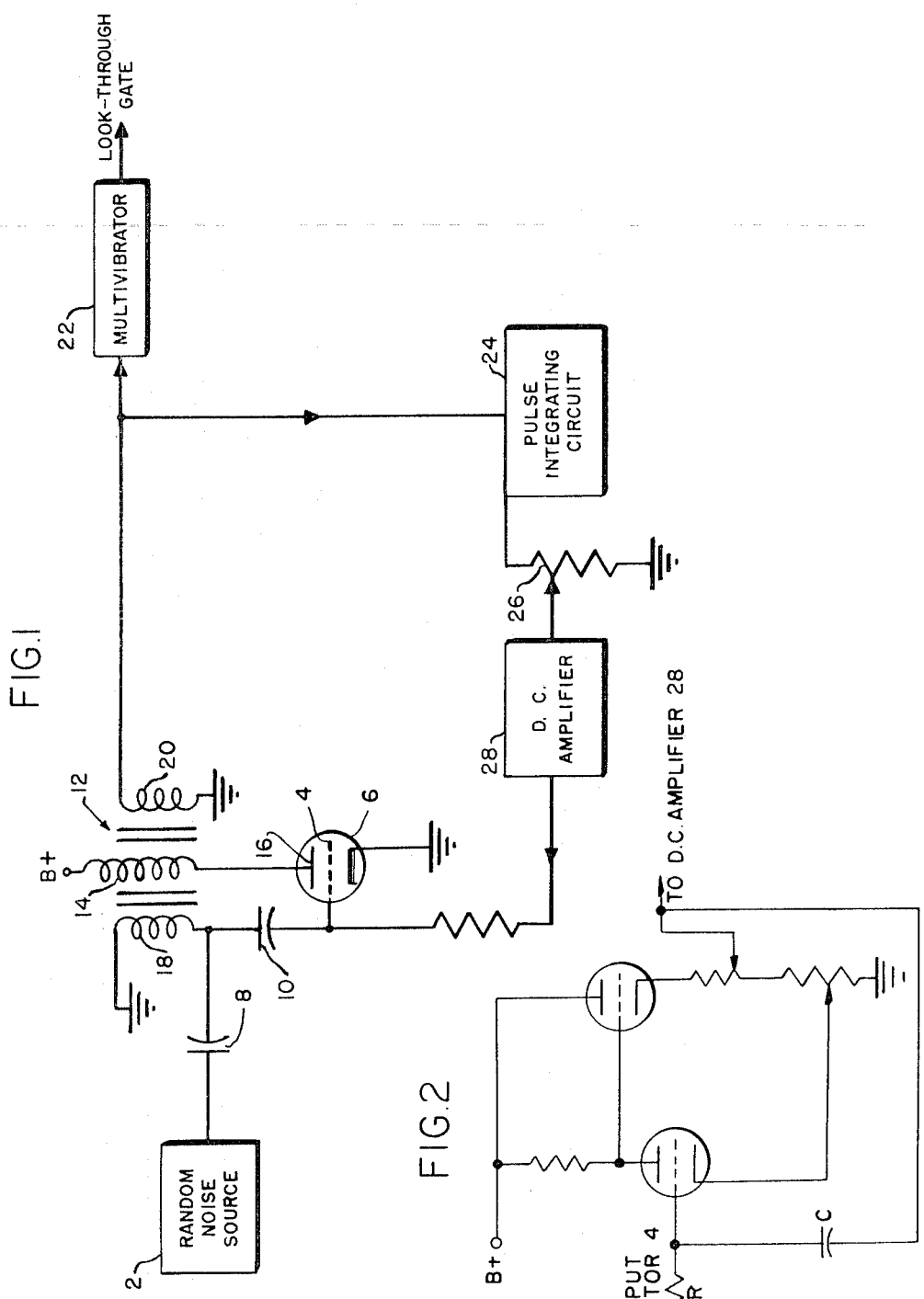
INVENTOR.
PAUL MERRILL BROWN
BY Harry M. Saragovitz

RANDOM PULSE GENERATOR

This invention relates to radio frequency jammers and more particularly to random pulse generators for use in radio frequency jamming apparatus.

As part of a countermeasure system, a receiver is used to monitor a victim signal while a jamming signal in close proximity is radiating energy on the same frequency. Leakage of jamming energy from the transmitting antenna to the receiving antenna usually prevents the victim signal from being observed. One means of overcoming this effect is to utilize time sharing look-through. Look-through is the process whereby information concerning an intercepted signal is obtained during a jamming period. In time-sharing look-through, the jammer transmitter and the surveillance radar are turned off for a short period while the various receivers are turned on. The rate of look-through should be sufficiently randomized to make it difficult for the enemy to evade being jammed by deliberate synchronization of the radar pulse-repetition frequency (PRF) with the look-through period of the jammer. In practice, it has been found that the look-through interval should occur at a random frequency which has an average period of approximately 0.25 seconds. Thus, it is desirable that the repetition frequency be randomized with an average frequency of 4 c.p.s.

It is therefore an object of the present invention to provide a look-through gate whose repetition frequency varies in a random manner.

It is yet another object of the present invention to provide a randomized repetion frequency which is stabilized at a prescribed average frequency.

In accordance with the present invention, there is provided a random pulse generator comprising a random frequency noise source and a blocking oscillator responsive to the output of said noise source. The output of the blocking oscillator is coupled to a pulse integrating circuit having an adjustable direct current output. The output from the integrating circuit is amplified and fed back to the blocking oscillator as a bias which is proportional to the average repetition frequency. The output of the blocking oscillator also triggers a multivibrator which provides the random look-through gate.

For a better understanding of the present invention, together with other and further objects thereof, reference is had to the following description taken in connection with the accompanying drawing, and its scope will be pointed out in the appended claims.

In the drawing FIG. 1 is a block schematic diagram illustrating one embodiment of my invention, and FIG. 2 illustrates one type of pulse-integrating circuit which may be embodied in my invention.

Referring to the drawing, there is shown at 2 a low-frequency noise generator such as a gas tube or noise diode having its output coupled to control grid 4 of single-pulse blocking oscillator 6 through coupling capacitor 8 and grid capacitor 10. Blocking oscillator 6 is of conventional design and includes the usual transformer 12 having one winding 14 connecting plate 16 of the oscillator to B+; a second winding 18 connected in series with grid capacitor 10; and an output winding 20. The output of blocking oscillator 6 from transformer winding 20 is applied simultaneously to multivibrator 22 which generates a random look-through gate pulse, and to a pulse integrating circuit 24 having an adjustable direct current output as indicated by potentiometer 26. Pulse integrating circuits are well-known in the art and one such circuit which may be used is shown in FIG. 2. The operation of this circuit is described on page 81 of "Electronic Instruments," Volume 21 of the Massachusetts Institute of Technology Radiation Laboratory Series. The values of R and C are chosen to provide a relatively long time constant with respect to the output pulses from oscillator 6. The direct current output of integrating circuit 24 is applied as a bias to control grid 4 through direct current amplifier 28.

In operation, the bias output applied to grid 4 of the oscillator 6 from integrating circuit 24 is adjusted for the prescribed average repetition frequency. The average bias developed across the output resistor of integrating circuit 24 will be a function of the pulse repetition frequency output of oscillator 6. Thus, if the repetition frequency from oscillator 6 should tend to increase the bias voltage applied to blocking oscillator grid 4 through amplifier 28 will become more positive and hence the repetition frequency of the oscillator will tend to decrease towards the prescribed average repetition frequency. If, on the other hand, the repetition frequency from oscillator 6 should tend to decrease, the bias voltage applied to grid 4 through amplifier 28 will become less positive and hence the repetition frequency from oscillator 6 will tend to increase towards the prescribed average frequency. It is therefore readily apparent that since this bias output is proportional to the average repetition frequency, the circuit will be stabilized at the prescribed average frequency selected.

While there has been described what is at present considered to be the preferred embodiment of this invention, it will be obvious to those skilled in the art that various changes and modifications may be made therein without departing from the invention and it is therefore aimed in the appended claims to cover all such changes and modifications as fall within the true spirit and scope of the invention.

What is claimed is:

1. A random pulse generator comprising a blocking oscillator having an input circuit and output circuit, a random frequency noise source connected to said input circuit for triggering said oscillator, integrating means connected to said output circuit for generating a direct current voltage proportional to the average repetition frequency of the output pulses of said oscillator, and means for coupling said direct current voltage to said input circuit whereby the period of said average repetition frequency is maintained substantially constant.

2. The device set forth in claim 1 wherein said last mentioned means comprises a direct current amplifier.

3. In a jamming system, means for stabilizing the period of the average randomized look-through frequency, said means comprising a blocking oscillator having at least a grid, plate and cathode, a random frequency noise source having its output coupled to said grid for triggering said oscillator, an integrating circuit responsive to the output pulses of said oscillator for producing a direct current voltage proportional to the average repetition frequency of said output pulses, and a direct current amplifier responsive to said direct current voltage and connected to said grid.

4. A random pulse generator comprising a blocking oscillator having an input circuit and output circuit, a noise source connected to said input circuit, a pulse-integrating circuit connected to said output circuit, and a direct current amplifier responsive to the output of said pulse generating circuit and connected to said input circuit.

* * * * *